(12) United States Patent
Albertson et al.

(10) Patent No.: US 8,698,489 B2
(45) Date of Patent: Apr. 15, 2014

(54) FLEXIBLE WHEEL SPEED SENSOR EXTERNAL TO CAPPED WHEEL BEARING

(75) Inventors: Todd D. Albertson, Macomb Township, MI (US); Vincent R. Sicilia, Rochester, MI (US); Josef Mack, Allenton, MI (US); Phanu Amatyakul, Brighton, MI (US); William P. Job, Armada, MI (US); Robert G. Sutherlin, Canton, MI (US); Michael L. Holly, St. Clair Shores, MI (US); Douglas N. Reed, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 684 days.

(21) Appl. No.: 12/951,279

(22) Filed: Nov. 22, 2010

(65) Prior Publication Data

US 2011/0181102 A1 Jul. 28, 2011

Related U.S. Application Data

(60) Provisional application No. 61/298,002, filed on Jan. 25, 2010.

(51) Int. Cl.
*G01P 3/48* (2006.01)
(52) U.S. Cl.
USPC ........................... 324/174; 324/207.25
(58) Field of Classification Search
USPC ............................................ 324/174, 207.25
See application file for complete search history.

(56) References Cited

U.S. PATENT DOCUMENTS

| 5,850,141 A * | 12/1998 | Adler ............................ 324/174 |
| 6,232,772 B1 * | 5/2001 | Liatard et al. ............ 324/207.25 |
| 7,126,328 B2 * | 10/2006 | Sakamoto ................. 324/207.25 |
| 7,923,993 B2 * | 4/2011 | Takahashi et al. ....... 324/207.25 |
| 2009/0285515 A1 | 11/2009 | Kawamura et al. |

FOREIGN PATENT DOCUMENTS

| DE | 19735978 A1 | 2/1999 |
| JP | 2000249138 A | 9/2000 |

* cited by examiner

*Primary Examiner* — Arleen M Vazquez
*Assistant Examiner* — Alesa Allgood
(74) *Attorney, Agent, or Firm* — Quinn Law Group, PLLC

(57) ABSTRACT

A wheel assembly for a non-driven wheel includes a rotating wheel hub with a shaft portion supporting a bearing inner race. A magnetic encoder is mounted for rotation with the shaft portion. A non-rotating component radially surrounds the shaft portion and has a bearing outer race. A cap is secured to the non-rotating component and covers the outer and inner races, the shaft portion and the magnetic encoder inboard of the races to seal an inboard side of the outer and inner races. A sensor is mounted to a non-rotating vehicle steering member externally to, not covered by, and not extending through the cap. The sensor is configured to deflect to be biased into continuous contact with an outer surface of the cap to read the magnetic encoder through the cap without extending through the cap.

16 Claims, 6 Drawing Sheets

_US 8,698,489 B2_

FLEXIBLE WHEEL SPEED SENSOR EXTERNAL TO CAPPED WHEEL BEARING

CROSS-REFERENCE TO RELATED APPLICATIONS

This application claims the benefit of U.S. Provisional Patent Application No. 61/298,002, filed Jan. 25, 2010, and which is hereby incorporated by reference in its entirety.

TECHNICAL FIELD

The invention relates to a speed sensor for a vehicle wheel.

BACKGROUND

Speed sensor assemblies for vehicle wheels are used to monitor the speed of the wheels for various purposes such as for implementing an automatic braking system (ABS), and/or as input to an engine or transmission controller. Typical speed sensor assemblies have included those used with capped wheel bearing assemblies, and those used with wheel bearing assemblies that use an inboard seal, but no bearing cap. Sensor assemblies integrated within a capped wheel bearing assembly typically have a magnetic encoder, often referred to as a tone ring, which rotates with the rotating part of the wheel assembly, and a stationary sensor spaced from the tone ring. Both of these components are sealed from the external environment by the bearing cap and one or more seals. Protecting the bearing, the tone ring and the sensor from the environment can be advantageous. However, servicing sensors integrated within a capped wheel assembly may require disassembly of the entire wheel assembly, and thus can require replacement of the entire wheel assembly even if only the sensor component may actually need replacement.

Speed sensors that are not sealed and capped within the bearing assembly have the advantage of easy removal for servicing. However, these designs typically have an exposed inboard seal and tone ring. This presents design challenges, as exposure to the environment can make it difficult to maintain a gap of a specified dimensional range between the sensor and the tone ring. Placing just the tone ring within a capped wheel assembly and positioning the sensor externally to the bearing cap to read the tone ring through the cap has the advantage of easy access to the sensor. However, such a design requires either that the sensor extend through the cap, thus diminishing the sealing effectiveness of the cap, or requires the use of a less precise tone ring. The latter is due to the increased distance between the sensor and the tone ring due to the bearing cap in between. The increased distance requires the use of a tone ring with fewer magnetic pole pairs in order for the pole pairs to be of a size that creates a sufficient magnetic field to be read by the sensor through the cap.

SUMMARY

A wheel assembly is provided with a robust sensor that provides highly accurate speed monitoring with a capped bearing design, without the disadvantages of an integrated sensor assembly. Specifically, a wheel assembly for a non-driven wheel includes a rotating wheel hub with a shaft portion supporting a bearing inner race. A magnetic encoder, also referred to as a tone ring, is mounted for rotation with the shaft portion. A non-rotating component radially surrounds the shaft portion and has a bearing outer race. The bearing inner race, outer race, and rolling elements in between comprise an inboard bearing. A cap is secured to the non-rotating component and covers the outer and inner races, the shaft portion, and the magnetic encoder inboard of the races. A sensor is mounted to a non-rotating vehicle steering member, such as a steering knuckle, so that the sensor is external to, not covered by, and does not extend through the cap. The sensor is configured to deflect to be biased into continuous contact with an outer surface of the cap to read the magnetic encoder through the cap without extending through the cap.

In at least one embodiment, the sensor has a distal portion and a narrowed midportion spaced from the distal portion. The sensor is configured to flex at the narrowed midportion when installed in and secured to the steering member with the distal portion deflected from an initial position to remain biased against the cap.

Thus, the sensor is mounted to the vehicle steering member externally to, not covered by, and not extending through the cap. The sensor is configured to deflect to be biased into continuous contact with an outer surface of the cap to read the magnetic encoder through the cap. Elimination of any gap between the sensor and the cap allows a highly accurate magnetic encoder to be used, such as one with forty-eight pole pairs. Because the cap needs no access hole for the sensor, debris is prevented from reaching the bearing, and bearing drag and its associated negative affect on fuel economy are reduced. Because the sensor does not extend through the cap, sealing of components covered by the cap is not compromised. Furthermore, because the sensor is external to the capped bearing, it is easy to remove and repair without disassembling or replacing the remaining components of the wheel assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic fragmentary illustration of the distal portion of the sensor of FIG. 6 shown in phantom with an integrated circuit, a capacitor, and a nonlinear wire connection there between;

FIG. 8 is a schematic fragmentary illustration of the distal portion of the sensor of FIG. 6 shown in phantom with another arrangement of the integrated circuit, capacitor and a nonlinear wire connection there between;

DESCRIPTION OF THE PREFERRED EMBODIMENTS

Figure 1:
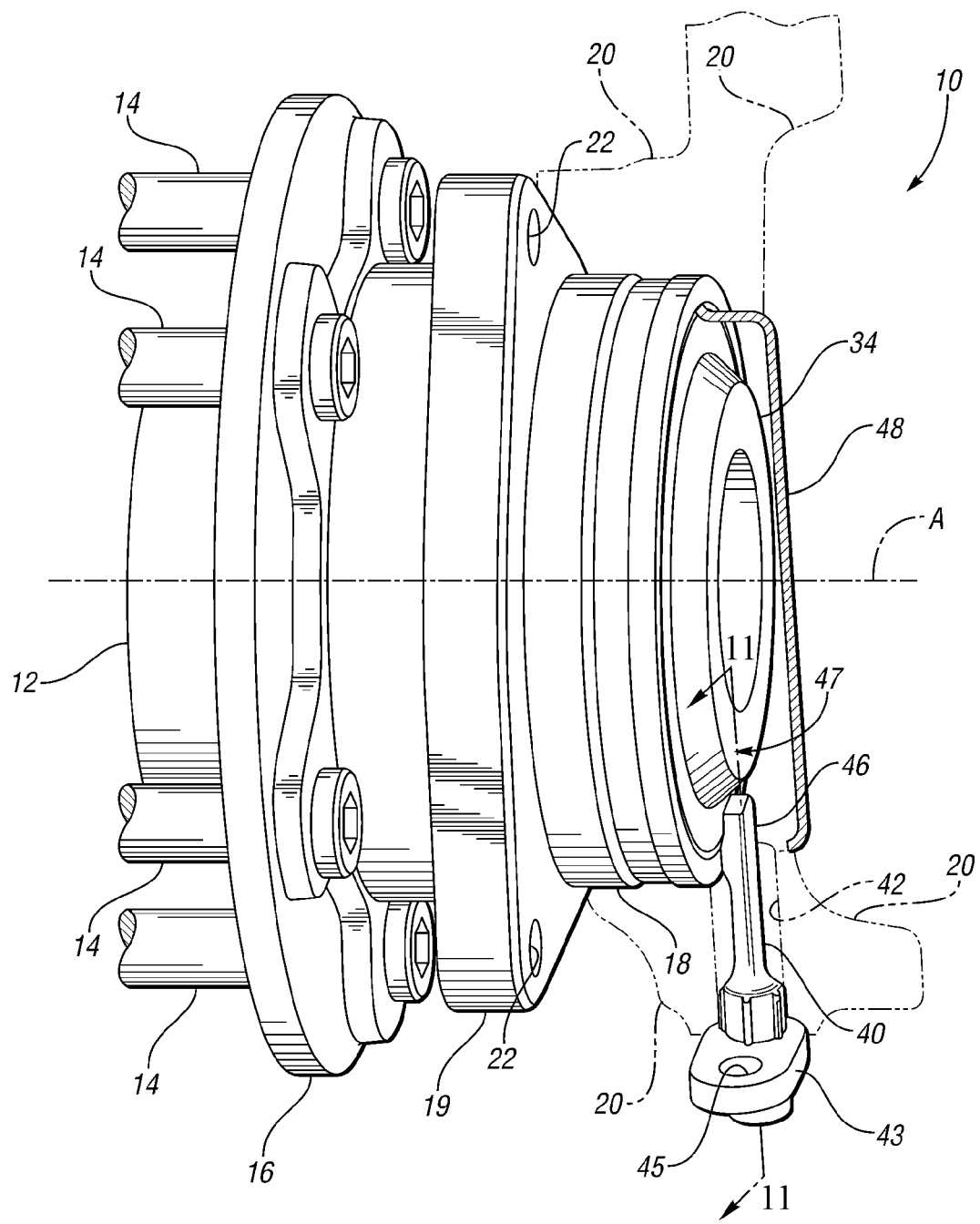
FIG. 1 is a schematic perspective illustration of a first embodiment of a wheel assembly with a capped inboard bearing and an external wheel speed sensor.

Referring to the drawings, wherein like reference numbers refer to like components throughout the several views, FIG. 1 shows a vehicle wheel assembly 10. A wheel hub 12 shown in partial fragmentary view is fastened to a wheel (not shown) with fasteners 14 through a radially-extending flange 16 of the wheel hub 12, and the wheel and hub 12 rotate about and define an axis of rotation A. A non-rotating component, referred to herein as a bearing outer race 18, is fastened to a steering knuckle 20 using fasteners (not shown) that extend through openings 22 in a flange portion 19 of the outer race 18 (two of three openings 22 shown) and through openings 24 (shown in FIG. 12) in the steering knuckle 20.

Figure 4A:
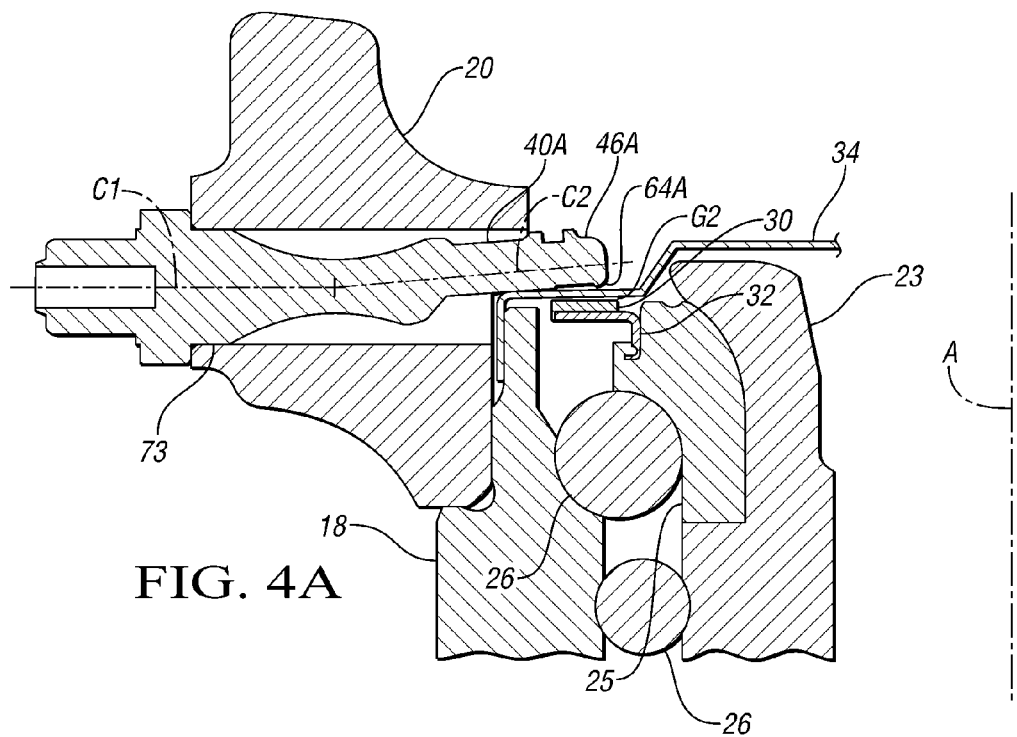
FIG. 4A is a schematic cross-sectional illustration in partial fragmentary view of the wheel assembly of FIG. 10 taken at lines 4A-4A with a cover removed and with an alternate wheel speed sensor in contact with the bearing cap and deflected a first amount.

The hub 12 has a shaft portion 23 radially surrounded by the outer race 18 as shown in FIGS. 4A, 4B, 10 and 12. The shaft portion 23 defines or supports an inner race 25 as shown in FIG. 4A, similar to inner race 25A of wheel assembly 10A of FIG. 11, which interfaces with rolling elements 26 that also contact an inner surface of the outer race 18, as also illustrated with hub 12A and outer race 18A of FIG. 11.

A magnetic encoder 30, shown in FIGS. 4A, 4B, 10, 11 and 12, is fit to the wheel hub shaft portion 23 and/or adhered to a metal stamping 32 that is press-fit to and rotates with the wheel hub shaft portion 23 so that the encoder 30 rotates with the wheel hub 12. The magnetic encoder 30 is an annular polymer ring with embedded ferritic particles establishing forty-eight pairs of alternating north and south magnetic poles around the circumference of the encoder 30, facing inboard. Only one pair of magnetic poles is illustrated in phantom on FIG. 10 as north pole N and south pole S, but 47 other like pairs are evenly distributed about the circumference of the encoder 30. The north pole N has a north pole near a radially-outward end and a south pole near a radially-inward end, while the adjacent south pole S has a south pole near a radially-outward end and a north pole near a radially-inward end. Magnetic encoders 30 with different numbers of pole pairs could also be used. For example, fewer than forth-eight pole pairs could also be used, such as forty-seven or forty-two pairs. Fewer pole pairs around the circumference of the encoder 30 can be sized to create a larger magnetic field, allowing a sensor to be spaced from the cap 34 by a gap. However, the precision of the speed sensor would be lessened.

Figure 4B:
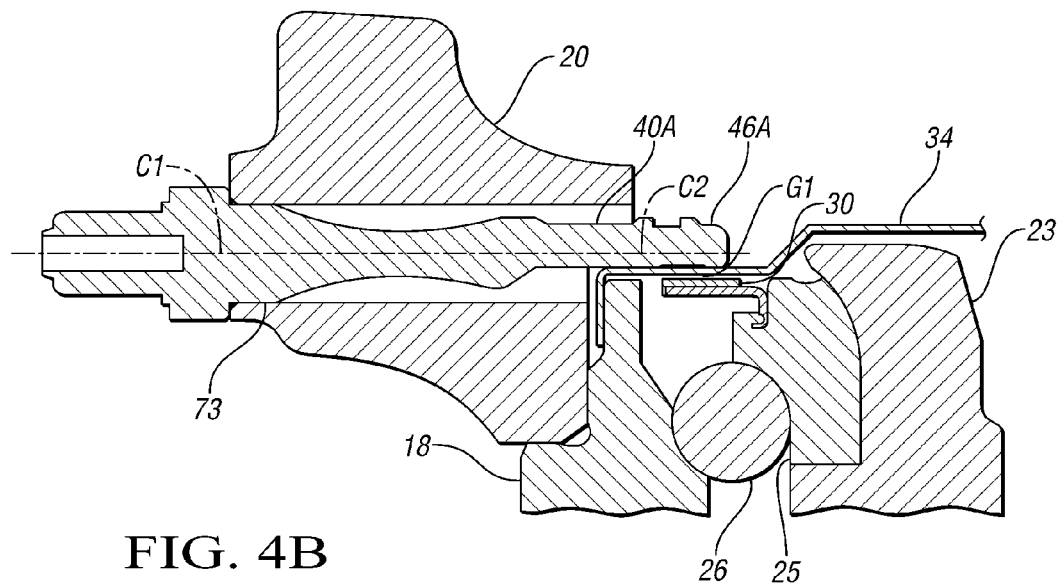
FIG. 4B is a schematic cross-sectional illustration in partial fragmentary view of a wheel assembly of FIG. 10 taken at the lines 4B-4B but with a different dimensional stack up so that the wheel speed sensor in contact with the bearing cap is deflected a second amount.

Referring to FIGS. 1 and 4B, a stainless steel cap 34 is fit over an outer surface of the outer race 18 to cover the shaft portion 23 of wheel hub 12, the magnetic encoder 30, the bearing races 18, 25 and rolling elements 26. Alternatively, the cap 34 could fit to an inner surface of the outer race 18. Because the wheel assembly 10 is for a non-driven wheel, a wheel spindle from the wheel (not shown) fit to splines 38 of the hub 12 (see FIG. 12) does not extend axially inward past the cap 34, permitting the cap 34 to cover and protect the aforementioned components from an inboard side of the wheel assembly 10. The wheel spindle may be webbed or plugged to prevent contamination from reaching the bearing assembly (outer race 18, rolling elements 26 and inner race 25) from the outboard side of the vehicle. As used herein, "inboard" means laterally closer to or towards a longitudinal centerline of a vehicle, and "outboard" means laterally further from or away from a longitudinal centerline of the vehicle.

Figure 12:
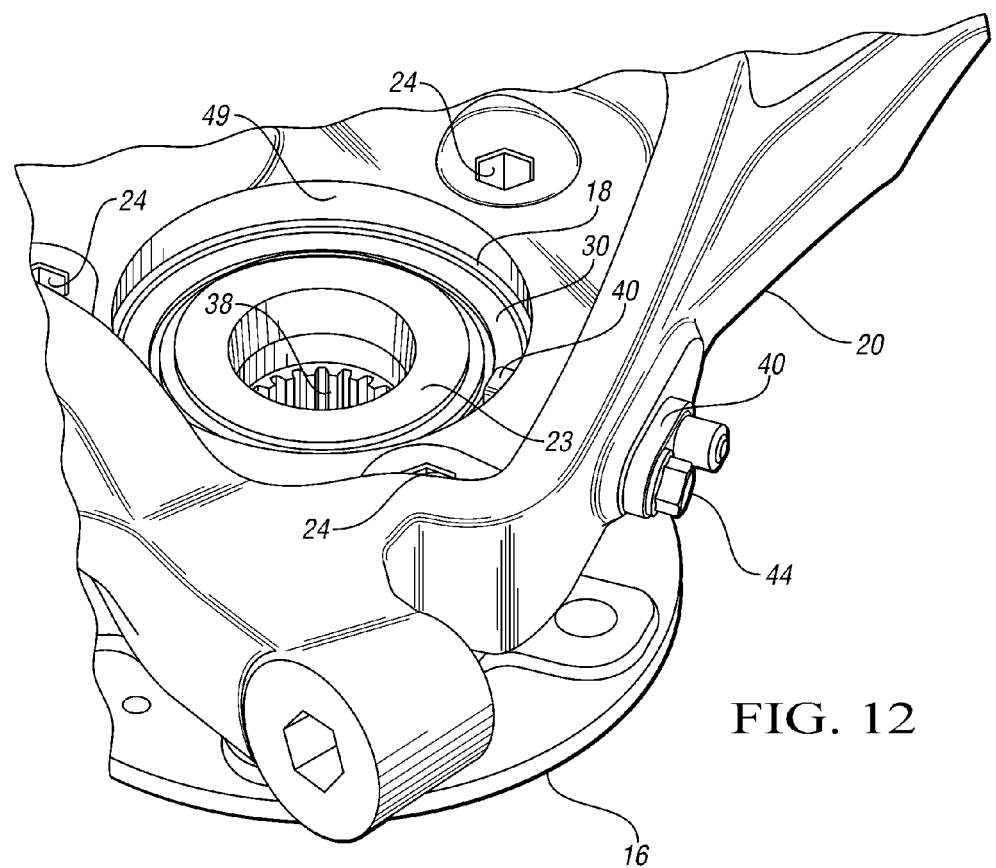
FIG. 12 is a schematic perspective illustration in partial fragmentary view of the wheel assembly with speed sensor of FIGS. 4A and 4B installed and secured to a steering knuckle.

Still referring to FIGS. 1 and 12, a speed sensor 40 is installed through an aperture 42 in the steering knuckle 20 and secured to the steering knuckle 20 with a fastener 44 fit through a reinforced opening 45 in a mounting flange portion 43 of the sensor 40 (see FIG. 1), as best shown in FIG. 12. The thickness of the mounting flange portion 43 is designed to prevent movement of the flange portion 43 at maximum stress due to bending of the sensor 40, as discussed below. When fully installed and secured to the steering knuckle 20, a distal portion 46 of the sensor 40 is flexed to remain in contact with an outer surface 47 of the cap 34, and may be referred to as a "zero gap" sensor, as there is no gap between the sensor 40 and the bearing cap 34. The sensor 40 is operable to sense the changing magnetic field of the forty-eight pole pairs N, S of the magnetic encoder 30 as the pole pairs rotate past the sensor 40 with the rotating hub 12 as a vehicle with wheel assembly 10 is driven. A secondary cover 48 is installed over the cap 34 and the distal portion 46 through an aperture 49 (shown in FIG. 12) in the steering knuckle 20 and secured to the steering knuckle 20. The secondary cover 48 protects the outer surface 47 of the bearing cap 34 from road debris, maintaining constant contact between the sensor 40 and the cap 34 over a full range of expected interference due to dimensional tolerance stack up of the wheel assembly 10 components, and with typical forces distributed over the wheel assembly 10 as the vehicle travels over the road.

Figure 2:
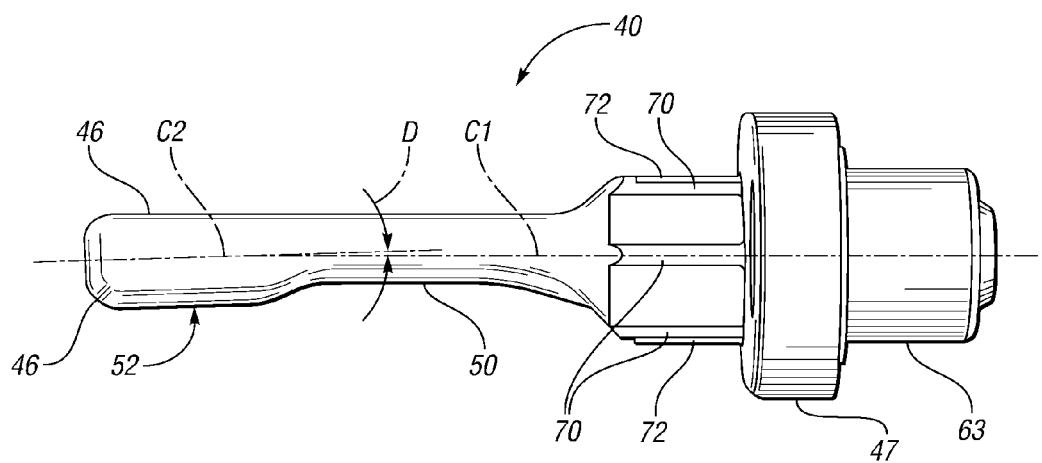
FIG. 2 is a schematic side view illustration of the wheel speed sensor of FIG. 1.
Figure 3:
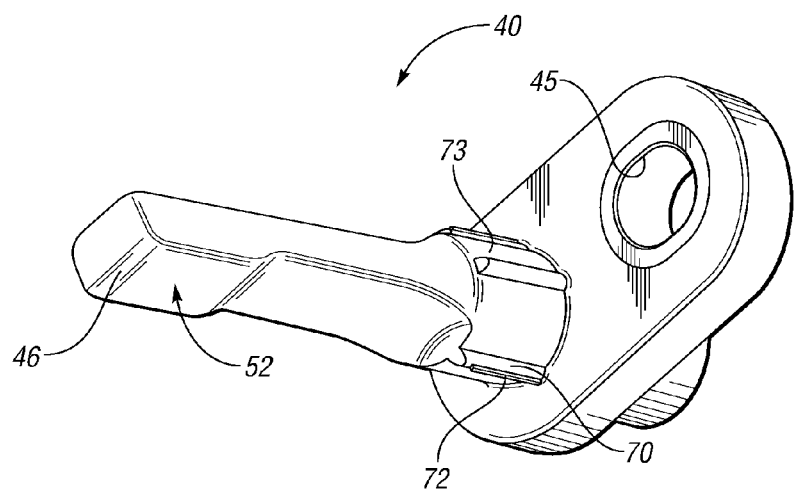
FIG. 3 is a schematic perspective illustration of the wheel speed sensor of FIGS. 1 and 2.

Referring to FIGS. 2 and 3, the sensor 40 is shown in greater detail. The sensor 40 has a narrowed midportion 50 spaced from the distal portion 46. As is apparent in FIG. 2, the distal portion 46 angles downward slightly by angle D relative to the midportion 50 such that distal portion 46 and midportion 50 do not have a common center axis. Midportion 50 has a center axis C1 and distal portion 46 has a center axis C2 angled relative to one another by angle D. That is, distal portion 46 and midportion 50 are not collinear. A contact surface 52 of the distal portion 46 is also angled downward, parallel to center axis C2. When the sensor 40 is installed through the aperture 42 of FIG. 1 and secured to steering knuckle 20, the midportion 50 must flex to overcome interference between the cap 34 and the distal portion 46 as illustrated with respect to the wheel assembly 10A of FIG. 11. The aperture 42 is designed to be adequately sized to allow the midportion 50 of the sensor 40 shown in FIG. 2 to flex over the full expected range, and the distal portion 46 to be deflected over a full expected range. When flexed and fully installed, the contact surface 52 is configured to be in full contact with the outer surface 47 (see FIG. 1) of the cap 34.

Because the midportion 50 is narrowed, flexing occurs in and stress is concentrated in the midportion 50 rather than in the distal portion 46. The midportion 50 is designed so that strain and stress due to flexing will not exceed predetermined amounts based on a range of expected interferences between the distal portion 46 and the bearing cap 34, due to stack up of dimensional tolerances of the wheel hub 12, outer race 18, bearing cap 34, steering knuckle 20 and sensor 40. Furthermore, the material of the sensor 40 is selected to ensure the required flexibility and strain below the strain limit over a wide temperature range, such as from −40 degrees Celsius to 125 degrees Celsius, and over an expected life of the sensor 40. For example, if the sensor 40 is made from a combination of nylon and glass, the relative amounts of each will be controlled to ensure flexibility. Those skilled in the art would be able to select an appropriate material to meet designed maximum bending stress and strain over a predetermined range of flexing.

FIGS. 4A and 4B show an embodiment using a sensor 40A with a slightly alternate design and with a designed gap G1 of 0.8 mm between the outer inboard-facing surface of the magnetic encoder 30 and the inner outboard-facing surface of the bearing cap 34, and with a maximum gap G2 of 1.6 mm permitted due to dimensional tolerances of the assembled components. Flexing of the sensor 40A will be such that the center axis C2 of the distal portion 46A is angled upward with respect to the center axis C1 of the midportion 50 by an angle up to 4.25 degrees, assuming the maximum 1.6 mm gap G2 as shown in FIG. 4A. If the assembled components resulted in an expected gap G1 of 0.8 mm, as designed, then the center axis C2 would be angled upward by only 0.4 degrees relative to the center axis C1, as illustrated in FIG. 4B. Flexing of the sensor 40A within this range will ensure that the contact force of the distal portion 46A against the cap surface 47 will not be so large that electronic components within the distal portion (discussed below) are damaged, and yet will ensure that there is a positive contact force keeping the surface 52 of the sensor 40A in contact with the cap 34. The sensor 40 of FIGS. 1, 2, 3 and 5 has the distal portion 46 angled downward relative to the midportion 50 in the unflexed state, as described above. The sensor 40 may be designed to be flexed so that the angle D of the center axis C2 of distal portion 46 to the center axis C1 of midportion 50 is 0.7 degrees when the gap G1 (as shown with respect to sensor 40A in FIG. 4B) is as designed (0.8 mm) and 4.0 degrees when the gap is at a maximum G2 (as shown with respect to sensor 40A in FIG. 4A) due to stack up of dimensional tolerances within design specifications.

Figure 5:
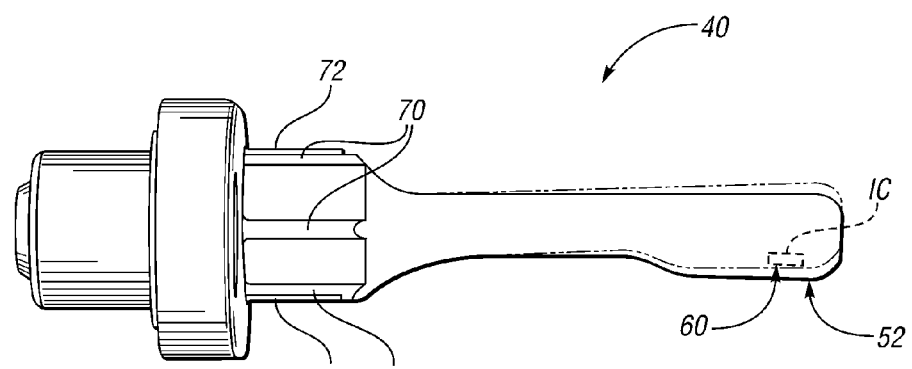
FIG. 5 is a schematic side view illustration of the wheel speed sensor of FIG. 1 showing a distal portion of the sensor in both a flexed position (in phantom) and an unflexed position with an integrated circuit embedded therein.
Figure 13:
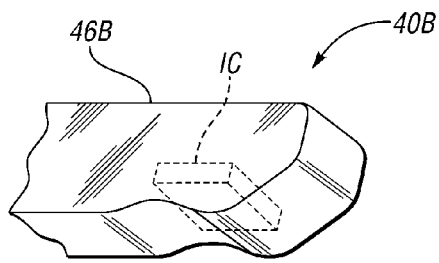
FIG. 13 is a schematic fragmentary illustration of an alternate embodiment of the distal portion of FIG. 6.
Figure 14:
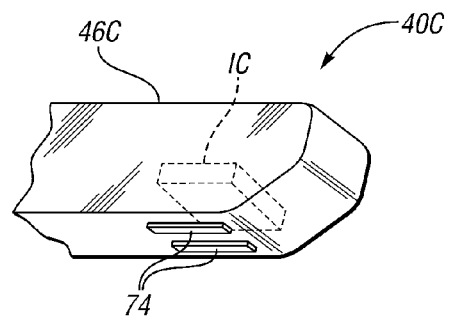
FIG. 14 is a schematic fragmentary illustration of another alternate embodiment of the distal portion of FIG. 6.

Referring to FIG. 5, the sensor 40 is shown unflexed in solid, with surface 52 in a first position, and flexed to an installed position by interference with the cap 34 of FIG. 1 (not shown in FIG. 5), with the flexed position shown in phantom. An integrated circuit IC and a capacitor CA are embedded within the distal portion 46 of the sensor 40. The integrated circuit IC has crystals that define a flat surface 60. The integrated circuit IC is embedded such that, when installed and in the flexed position (assuming a predetermined interference with the bearing cap 34 of FIG. 1 resulting from a designed gap G1 (see FIG. 4B) of, for example 0.7 mm, and therefore a predetermined amount of flexing to an installed position), the flat surface 60 is parallel with the outer surface 47 of the cap 34 in order to optimize the ability of the integrated circuit IC to read the magnetic field variation of the encoder 30. In another embodiment of a sensor 40B, alike in all other aspects to sensors 40 and 40A, the surface of a distal portion 46B configured to be in contact with the cap 34 of FIG. 1 may be convex, with the portion directly aligned with the integrated circuit IC not in contact with the cap 34, as shown in FIG. 13. Alternatively, in another embodiment of a sensor 40C, alike in all other aspects to sensors 40 and 40A, the surface of a distal portion 46C configured to be in contact with the cap 34 of FIG. 1 may have raised ribs 74 in areas not directly aligned with the integrated circuit IC as shown in FIG. 14, similar to ribs 70 and 72 on the sensor 40, to alleviate any direct pressure on the integrated circuit IC.

Figure 7:
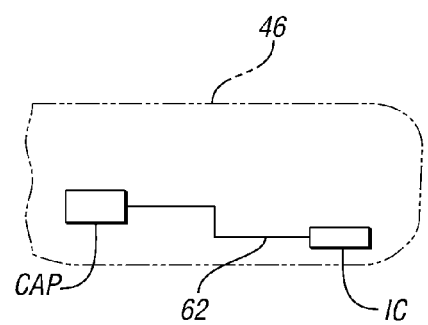
Figure 8:
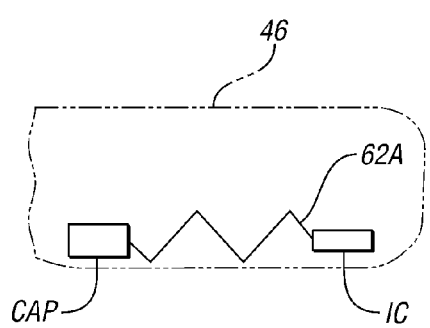
Figure 9:
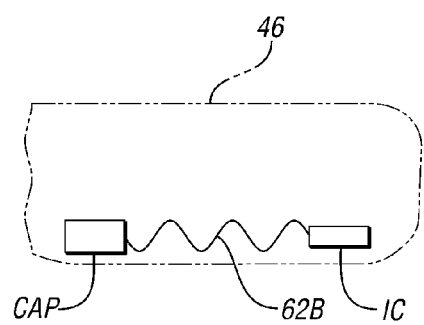
FIG. 9 is a schematic fragmentary illustration of a distal portion of the sensor of FIG. 6 with still another arrangement of the integrated circuit, capacitor and nonlinear wire connection.
Figure 10:
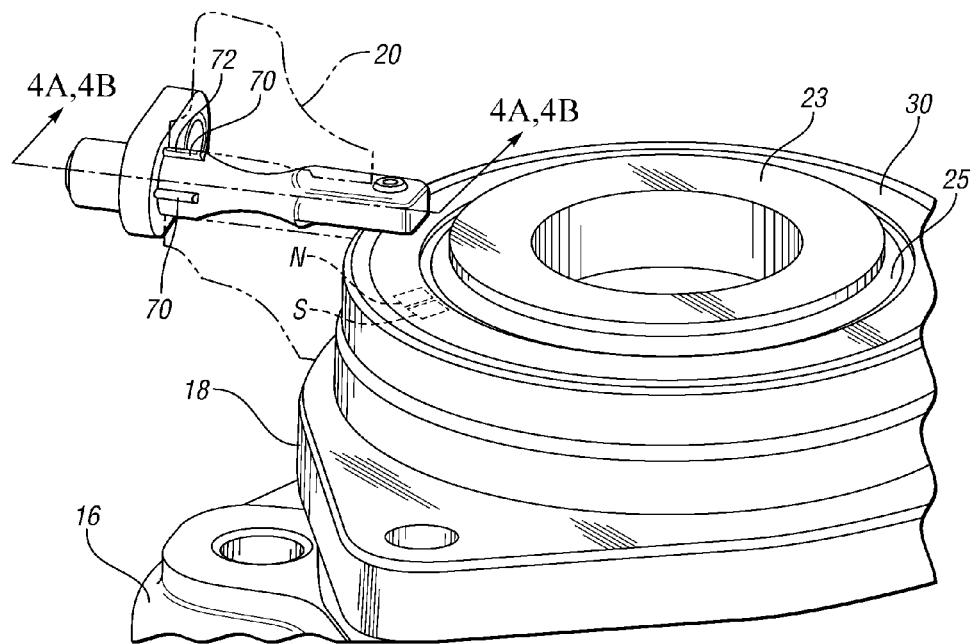
FIG. 10 is a schematic perspective illustration in partial fragmentary view of the wheel assembly with the sensor of FIGS. 4A and 4B, with the cap removed to show the magnetic encoder.

In order to allow the midportion 50 to be narrowed and to flex as designed, the integrated circuit IC and a capacitor CAP and other embedded electronic components of the sensor 40 are embedded within the distal portion 46, as shown in FIG. 7. Wiring 62 connecting the integrated circuit IC and the capacitor CAP is preferably positioned within the sensor 40 in a non-linear manner in order to prevent any tension in the wiring 62 due to the flexing. Additional wiring (not shown) runs from the electronic components to a rear portion 63 (see FIG. 2) of the sensor 40 and out of the sensor 40 to an electronic controller. The installed shape of the wiring 62 may be varied, as shown by wiring 62A of FIG. 8 and wiring 62B of FIG. 9, but in all cases is preferably nonlinear.

Figure 6:
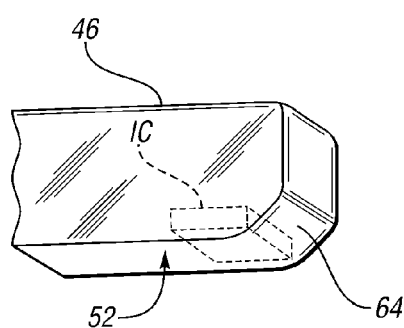
FIG. 6 is a schematic fragmentary side view illustration of the distal portion of the wheel speed sensor of FIG. 2 with an integrated circuit shown in phantom.
Figure 11:
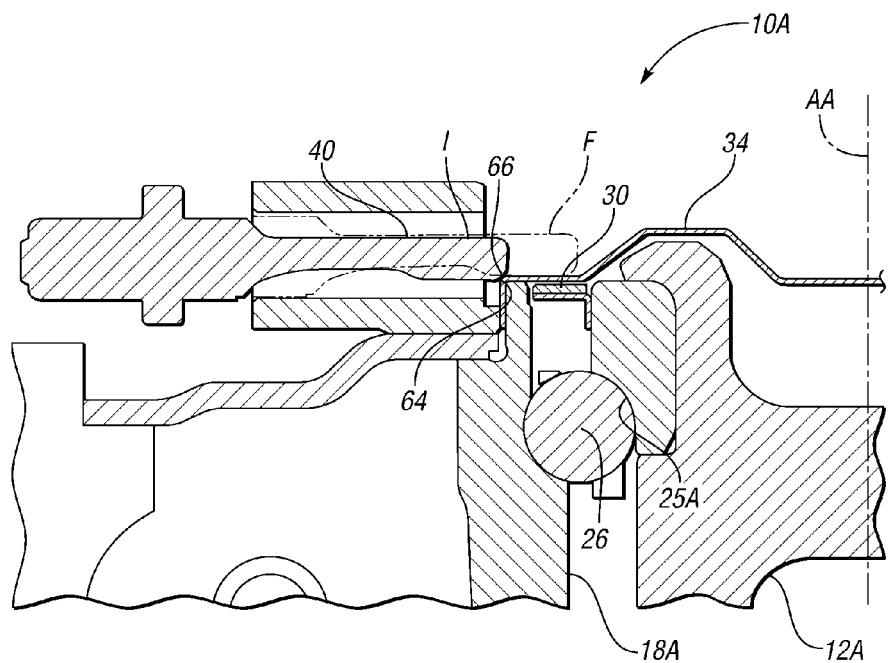
FIG. 11 is a schematic cross-sectional illustration in partial fragmentary view of the wheel assembly of FIG. 1 taken at lines 11-11 showing a shape of the distal portion of the sensor easing installation of the sensor to an installed position, shown in phantom, despite initial interference with the cap.

Referring to FIG. 6, the distal portion 46 is shown with a shaped exterior at a portion that initially interferes with the bearing cap 34 during installation. Specifically, the portion of the distal portion 46 leading into the contact surface 52 has a chamfered corner 64. The chamfered corner 64 has rounded edges to further ease installation of the sensor 40. As shown in FIG. 11, the chamfered corner 64 makes initial contact with a rounded corner 66 of the bearing cap 34 when the sensor 40 is at an initial contact position indicated as I during installation. The radii of the chamfered corner 64 and the rounded corner 66 are selected so that the sensor 40 and bearing cap 34 will have initial interference along the radii of chamfered corner 64 and rounded corner 66 over the entire range of interferences due to dimensional tolerance stack up, aiding in low force insertion with no sharp rises in the insertion force as the sensor 40 is inserted to a final installed position shown partially in phantom and indicated as F. Similarly, the distal portion 46A of the sensor 40A of FIGS. 4A and 4B has a rounded or chamfered edge 64A at a lead-in corner. The chamfered edges 64, 64A and rounded corner 66 of the cap 34 ensure that forces on the sensor 40 or 40A and strains and stresses due to bending of the sensor 40 or 40A do not exceed predetermined maximum levels to prevent damage to the sensor 40 or 40A and its internal electronic components (e.g., the integrated circuit IC and the capacitor CAP).

The sensors 40 and 40A are both designed with optional raised ribs 70 (see FIGS. 2 and 5) on an outer surface that are positioned to center the sensors 40, 40A so that the contact surface 52 will be parallel with the cap surface 47 when fully installed. The length of the ribs 70 is selected to keep a base portion 73 of the sensor 40 centered. The base portion 73 is the portion that is configured to remain in contact with the steering knuckle 20 throughout the range of bending, as illustrated with respect to sensor 40A in FIGS. 4A and 4B. Additionally, secondary ribs 72 extend from at least selected ones of the ribs 70, e.g., an uppermost and a lowermost rib 70 as viewed in FIGS. 2 and 5, as these ribs are likely to absorb forces due to flexing of the sensors 40, 40A. The secondary ribs 72 may be referred to as crush ribs, and are configured to deform under sufficient force during installation to absorb the installation forces, protecting the sensitive electronic components (integrated circuit IC and capacitor CAP).

While the best modes for carrying out the invention have been described in detail, those familiar with the art to which this invention relates will recognize various alternative designs and embodiments for practicing the invention within the scope of the appended claims.

The invention claimed is:

1. A vehicle wheel assembly comprising:
   a wheel hub defining an axis of rotation and having a radially-extending flange and a bearing inner race on an outer surface of the wheel hub such that the bearing inner race rotates with the wheel hub;
   a non-rotating steering knuckle;
   a bearing outer race radially-outward of the bearing inner race and secured to the steering knuckle such that the bearing outer race is non-rotating;
   a magnetic encoder configured to rotate with the wheel hub;
   a cap covering the wheel hub, the magnetic encoder and a portion of the bearing outer race from a radially-inboard direction; and
   a sensor installed in and secured to the steering knuckle outside of the capped wheel hub, and configured to be in contact with the cap to sense a magnetic field of the rotating magnetic encoder through the cap and thereby determine the speed of rotation of the wheel hub.

2. The vehicle wheel assembly of claim 1, wherein the sensor is configured such that strain in the sensor is less than a predetermined maximum strain and a contact force of the sensor on the cap is less than a predetermined maximum contact force when the sensor is installed in and secured to the steering knuckle with the sensor in contact with the cap.

3. The vehicle wheel assembly of claim 1, wherein a distal portion of the sensor has a shape such that, when initial contact of the distal portion with the cap during installation occurs with up to a predetermined maximum interference between the cap and the distal portion, the shape of the distal portion ensures that strain in the sensor is less than a predetermined maximum strain and a contact force of the sensor on the cap is less than a predetermined maximum contact force during installation of the sensor and when the sensor is fully installed in and secured to the steering knuckle.

4. The vehicle wheel assembly of claim 1, wherein the magnetic encoder has at least forty-eight pairs of alternating positive and negative magnetic poles.

5. The vehicle wheel assembly of claim 1, further comprising:
   a cover secured to the steering knuckle over the cap and sensor.

6. The vehicle wheel assembly of claim 1, wherein the sensor has a distal portion and a narrowed midportion spaced from the distal portion; wherein the sensor is configured to flex at the narrowed midportion when installed in and secured to the steering knuckle with the distal portion thereby deflected from an initial position to remain biased against the cap.

7. The vehicle wheel assembly of claim 6, wherein a surface of the distal portion in contact with the cap has one of a convex shape and raised ribs.

8. The vehicle wheel assembly of claim 6, wherein the sensor includes an integrated circuit and a capacitor connected with the integrated circuit by at least one wire; wherein the integrated circuit and the capacitor are positioned in the distal portion of the sensor that contacts the cap; and wherein the wire has a non-linear shape within the sensor prior to installation of the sensor in the steering knuckle and prior to flexing of the sensor.

9. The vehicle wheel assembly of claim 6, wherein the distal portion and the narrowed midportion are not collinear prior to flexing of the sensor.

10. The vehicle wheel assembly of claim 6, wherein the distal portion contacts an outer surface of the cap; wherein the sensor includes an integrated circuit embedded in the distal portion and operable to determine the magnetic field of the magnetic encoder; wherein the integrated circuit defines a substantially flat surface facing the outer surface of the cap; and wherein the flat surface of the integrated circuit is substantially parallel to the outer surface of the cap when the sensor is secured to the steering knuckle with the distal portion in contact with the cap.

11. The vehicle wheel assembly of claim 6, wherein the distal portion is angled relative to the midportion when not flexed; and wherein the distal portion has an outer surface configured to be substantially parallel to an outer surface of the cap when the midportion flexes and the outer surface of the distal portion is in contact with the outer surface of the cap.

12. The vehicle wheel assembly of claim 1, wherein the sensor has an outer surface with ribs positioned to center the sensor within an aperture in the vehicle steering knuckle.

13. The vehicle wheel assembly of claim 12, wherein at least some of the ribs have secondary ribs configured to deform to absorb at least some of the force due to flexing of the sensor when the sensor is installed and secured to the steering knuckle and in contact with the cap.

14. A wheel assembly comprising:
   a rotating wheel hub with a shaft portion supporting a bearing inner race such that the bearing inner race rotates with the shaft portion of the wheel hub;
   a magnetic encoder mounted for rotation with the shaft portion;
   a non-rotating vehicle steering knuckle;
   a bearing outer race radially surrounding the shaft portion and operatively connected to the non-rotating vehicle steering knuckle such that the bearing outer race is non-rotating;
   a cap secured to the non-rotating component and covering the outer and inner races, the shaft portion and the magnetic encoder inboard of the races to seal an inboard side of the outer and inner races;
   and
   a sensor mounted to the vehicle steering knuckle externally to, not covered by, and not extending through the cap and configured to deflect and thereby be biased into continuous contact with an outer surface of the cap to read the magnetic encoder through the cap without extending through the cap.

15. The wheel assembly of claim 14, wherein the magnetic encoder has forty-eight pairs of alternating north and south magnetic poles.

16. A vehicle wheel assembly comprising:
   a wheel hub defining an axis of rotation and having a radially-extending flange and a bearing inner race on an outer surface of the wheel hub; wherein the bearing inner race rotates with the wheel hub;
   a non-rotating steering knuckle;
   a bearing outer race radially-outward of the bearing inner race and secured to the steering knuckle such that the bearing outer race is non-rotating;
   a magnetic encoder configured to rotate with the wheel hub;
   a cap covering the wheel hub, the magnetic encoder and a portion of the bearing outer race from a radially-inboard direction;
   a sensor installed in and secured to the steering knuckle outside of the capped wheel hub, and configured to be in contact with the cap to sense a magnetic field of the rotating magnetic encoder through the cap and thereby determine the speed of rotation of the wheel hub;

wherein the sensor has a distal portion and a narrowed midportion spaced from the distal portion; wherein the sensor is configured to flex at the narrowed midportion when installed in and secured to the steering knuckle with the distal portion thereby deflected from an initial position to remain biased against the cap;

wherein the sensor includes an integrated circuit and a capacitor connected with the integrated circuit by at least one wire; wherein the integrated circuit and the capacitor are positioned in the distal portion of the sensor that contacts the cap; wherein the wire has a nonlinear shape within the sensor prior to installation of the sensor in the steering knuckle and prior to flexing of the sensor; and wherein the distal portion and the narrowed midportion are not collinear prior to flexing of the sensor.

* * * * *